(12) United States Patent
Mayes et al.

(10) Patent No.: US 9,959,175 B1
(45) Date of Patent: May 1, 2018

(54) RESTORING DELETED OBJECTS IN A WEB APPLICATION

(71) Applicant: Spanning Cloud Apps LLC, Hopkinton, MA (US)

(72) Inventors: Brandon Mayes, Austin, TX (US); Joel Rosinbum, Austin, TX (US); Patricia Cifra, Austin, TX (US); Gregory L. Alexander, Austin, TX (US)

(73) Assignee: Spanning Cloud Apps, LLC, Hopkinton, MA (US)

( * ) Notice: Subject to any disclaimer, the term of this patent is extended or adjusted under 35 U.S.C. 154(b) by 24 days.

(21) Appl. No.: 14/788,533

(22) Filed: Jun. 30, 2015

(51) Int. Cl.
*G06F 12/00* (2006.01)
*G06F 11/14* (2006.01)

(52) U.S. Cl.
CPC ...... *G06F 11/1451* (2013.01); *G06F 11/1435* (2013.01); *G06F 2201/84* (2013.01)

(58) Field of Classification Search
CPC .......... G06F 11/1451; G06F 11/1435
USPC .................................. 711/103, 162
See application file for complete search history.

(56) References Cited

U.S. PATENT DOCUMENTS

| | | | | |
|---|---|---|---|---|
| 6,397,227 B1* | 5/2002 | Klein | ................ | G06F 17/30377 |
| 2005/0138464 A1* | 6/2005 | Chong | ............... | G11B 20/1816 |
| | | | | 714/5.1 |
| 2012/0246399 A1* | 9/2012 | Nishi | .................. | G06F 12/0246 |
| | | | | 711/103 |
| 2015/0006608 A1* | 1/2015 | Eberlein | ................ | H04L 67/16 |
| | | | | 709/202 |

* cited by examiner

*Primary Examiner* — Pierre Miche Bataille
(74) *Attorney, Agent, or Firm* — Slater Matsil, LLP

(57) ABSTRACT

Systems and methods for a backing up and/or restoring data in a cloud based application are provided. Objects that are deleted in bulk are restored in bulk. The relationships between the objects that were deleted are determined at the time of backup and used during the restore process. The restored objects have the same relationships as the original objects even when the objects are not identical. The restore process accounts for data or information in the objects that cannot be restored or that is assigned by the web application to which the objects are restored.

19 Claims, 6 Drawing Sheets

RESTORING DELETED OBJECTS IN A WEB APPLICATION

FIELD OF THE INVENTION

Embodiments of the invention relate to systems and methods for protecting data. More particularly, embodiments of the invention relate to systems and methods for restoring data in a web application and more specifically to systems and methods for restoring related objects in the web application

BACKGROUND

Applications that are accessed over the cloud are increasingly available and are increasingly used. Cloud-based applications may be accessed using a browser and/or other locally installed software. Cloud-based applications are also associated with significant amounts of data that may also be stored in the cloud. Cloud-based office suite applications are associated with documents, spreadsheets, emails, presentations, and the like. Customer relationship management applications are associated with customer-centric information such as account and contact information.

In some applications, the data associated with a cloud-based application includes related data or objects. The data may be related hierarchically or linked, for example. Over time, the data can change. Data may be added or updated Data or objects may also be deleted. Data can be deleted in various ways and for various reasons. Data may be deleted intentionally, for example, in order to save money on storage costs. Data can also be deleted after the data has been archived. Data may also be deleted accidentally or maliciously.

When some of the data is related, such as in hierarchically related or linked objects, the deletion of a single object may have a similar impact on related objects. For example, the deletion of a particular object may result in the deletion of that object's children. Restoring the deleted object may require the restoration of that object's children.

This can be difficult in some examples at least because it is difficult to identify the relationships between different objects. The restore process is further complicated when the objects have unique identifiers that cannot be restored for various reasons. Systems and methods are needed for restoring data such as objects in an application such as a cloud-based application.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the invention generally relate to protecting data in a distributed environment such as the cloud or Internet. Embodiments of the invention may also be implemented in other network environments. Embodiments of the invention relate to backing up and/or restoring data in a cloud-based web application with a cloud-based data protection application.

Data associated with a web based application may be stored such that the data is related. In one example, the data may be arranged as related objects, which may have different types. The relationships may be hierarchical such that a parent node or object is associated with one or more levels of children objects.

When backing up related objects, relationships between the various objects are determined and stored along with the objects. In one example, the relationships are discovered by examining fields associated with the objects. When a field of a particular object includes data (e.g., an identifier) corresponding to another object, a relationship can be determined. In addition, each object may have a type and information that identifies what type of objects can reference it. With this information, the relationships between the objects can be determined when the objects are backed up.

During a restore operation, these relationships are used to ensure that the objects are restored successfully and such that the restored objects have the same relationships as the original objects. This can be complicated when there are fields that cannot be restored. For example, some objects may have an identifier that is assigned by the web application. As a result, this particular field cannot be restored from the backup. Embodiments of the invention account for these types of fields during the restore process.

Some of the object's data or fields may be updated to account for changes associated with the fields assigned by the web application. For example, restoring an object may include issuing a create request to the web application. The web application then creates the object, with a unique identifier, and the data protection application can then populate the object with data from the backed up object. At the same time, the new information is retrieved and used to update fields in objects that are subsequently restored. When the restoration is complete, the objects have the same relationships that existed in the original objects, even if the restored objects are not identical to the original objects. In one example, the client or user may not be aware of the difference. In other words, the restore process, in this sense, is transparent to the user or client.

Figure 1:
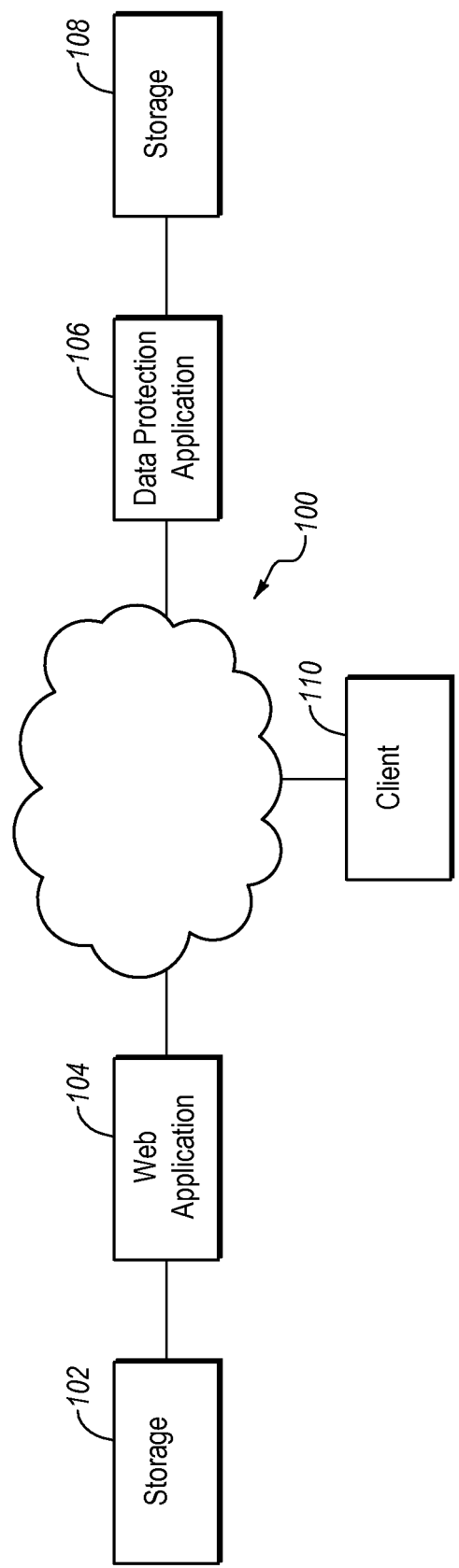
FIG. 1 is an example of an environment in which embodiments of the invention may be implemented.

FIG. 1 illustrates an example of an environment in which embodiments of the invention may be implemented. FIG. 1 illustrates a cloud 100, which may include a network such as the Internet. FIG. 1 also illustrates relationships between a web application 104, a data protection application 106, and client 110, which may communicate over the cloud. Each of the web application 104, the data protection application 106, and the client may include a computing device or computer that includes one or more processors. They may be embodied as server computers and/or client devices. The client 110, for example, may be a desktop computer, a mobile device, a tablet device, or the like. Each of the web application 104, data protection application 106 and client may include memory of various types and may have network modules for communicating over a network.

The web application 104 is an example of a cloud-based application that provides services or applications to the client 110 or to a user of the client 110. Example cloud-based applications include, but are not limited to, office suite applications, customer relationship management applications, storage applications, or the like. The client 110 may access the web application 104 using, for example a browser and/or a locally installed application that may cooperate with the browser.

The web application 104 is also associated with data that may be stored in a storage 102. The storage 102 may range from a hard drive to a data center. More generally, the web application 104 can be provided to multiple clients that all have access to the web application 104 over the cloud 100. Thus, the storage 102 may be very large and may be organized such that each client's data is separate and protected from the data of other clients.

The data protection application 106 is also an example of a cloud-based application. The data protection application 106, however, is also configured to cooperate with the web application 104 and/or the client 110 to generate and store backups of the client's data on the storage 102. The data of the client 110 stored on the storage 102 is backed up on the storage 108 or at another location or device. The data protection application 106 may also be configured to restore the client's data from the backups stored on the storage 108. The data protection application 106 may be able to restore data to various points in time based on an appropriate request from the client 110. A format of the backup data may differ from a format of the original data on the storage 102.

Figure 2:
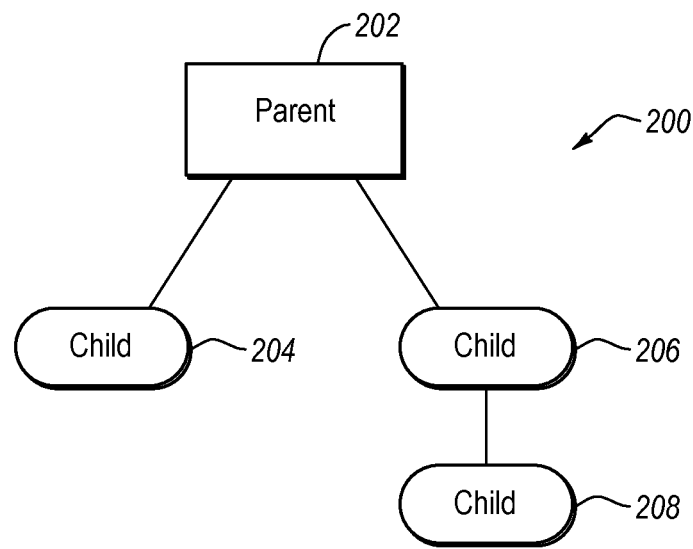
FIG. 2 illustrates an example of data that includes related objects.

FIG. 2 illustrates an example of data that is associated with one or more clients. FIG. 2 illustrates data 200 that is arranged hierarchically or that includes relationships. In this example, the data 200 may include a parent object 202 (or node). The parent object 202 may be associated with child objects 204 and 206. The child object 206 may also have a child object 208. Embodiments of the invention are not limited to the data 200, which may be arranged in a different manner and which may or may not be hierarchical. In one example, the data is arranged such that one object (or other data) has a relationship to another object or other data. In fact, a particular object may be a root object, may have multiple parent objects, multiple child objects, or the like or combination thereof.

In addition, the objects included in the data 200 may have different types. For example, the object 202 may be a document and the child objects 204 and 206 may be contributing authors. In a customer relationship context, the object 202 may be an account and the objects 204 and 206 may be contacts associated with the account. In this example, the object 208 may be details about the contact object 206, for example an image. The data protection application 106 may be configured to create a backup of the data 200 and may be configured to restore the data 200.

In one example, restoring the data 200 may result in the creation of a new node or a new object that is populated with data from the backup object. Embodiments of the invention account for situations where certain portions of the data cannot be restored or for situations where the web application generates new data during the restore process. Thus, the restored object may be nearly the same object.

Figure 3:
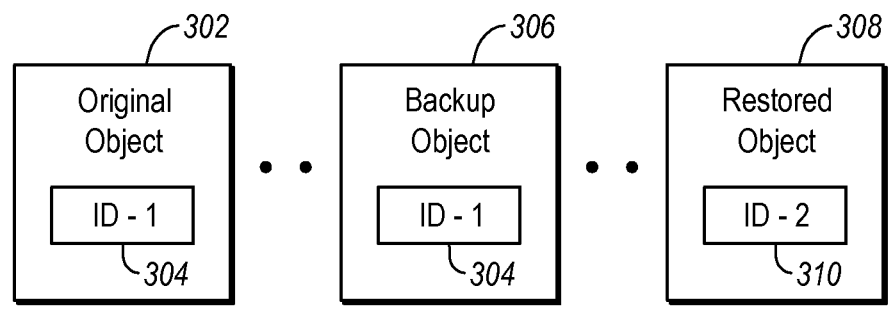
FIG. 3 illustrates examples of an original object, a backed up object, and a restored object.

FIG. 3 illustrates examples of objects in various states. FIG. 3 illustrates the same object in an original state, a backup state, and a restored state. More specifically, FIG. 3 illustrates an original object 302 that may be stored in the storage 102 of the web application 104. When the data protection application 106 backs up the object 302, it is stored as a backup object 306 in the storage 108. However, the data may be stored in a different format and may not be recognized as an object from the perspective of the web application. Nonetheless, the backup object 306 includes all of the information or data included in the original object 302. The backup object 306 may also be associated with additional metadata that is generated during the backup process. In one example, the original object 302 has an identifier 304 that is determined and assigned by the web application 104. The backup object 306 may include a copy of the identifier 304.

When the object is restored, the restored object 308 may have an identifier 310 that is different from the identifier 304. In this sense, the restored object 308 is not identical to the original object 304, but is nearly identical. Embodiments of the invention can restore the object 308 such that the object is identical at least from the perspective of the client, which may be unaware of the identifier 304 or 310. Further, embodiments of the invention ensure that the restored objects have the same relationships that were identified during the backup process.

During a restore operation, an object may be restored by issuing a create request, which results in the assignment of the new identifier 310 and, by populating the newly created object with the other data stored in the backup object 306. The new identifier may be used in the restoration of subsequent objects.

Figure 4:
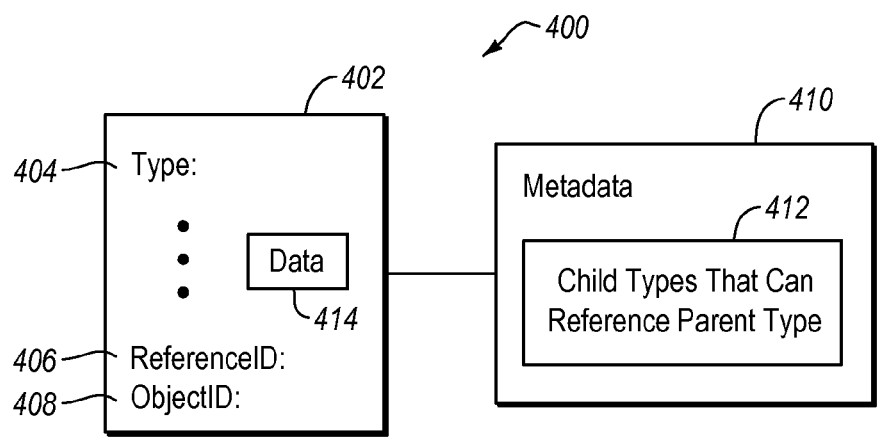
FIG. 4 illustrates an example of an object and illustrates examples of fields or metadata that may be associated with the object.

FIG. 4 illustrates an example of an object 400, which is similar to other data and objects discussed herein. The object 400 may include various fields including, but not limited to, a type field 404, a reference ID 406, and an object ID 408 (which may be assigned by the web application). The object 400 may also include data 414, which may also be stored in fields or in other manners. The object 400 is associated with metadata 410 including metadata 412. The metadata 412 identifies child types that can reference parent types. Stated differently, the metadata 412 may identify object types that can reference the object 400. This may be used to determine the relationships existing between objects being backed up.

In one example, the relationships between parent nodes or objects and children nodes or objects are not necessarily known by observing a single node alone. Even if an object were to include a parent ID field, the parent ID field may be empty and may not necessarily refer to the parent node or object. The parent object may be referenced using a field that is not apparent. For example, some pre-processing of all nodes may be required before relationships can be understood while directly examining a single node in the hierarchy. Such an example is described in further detail below.

Figure 5:
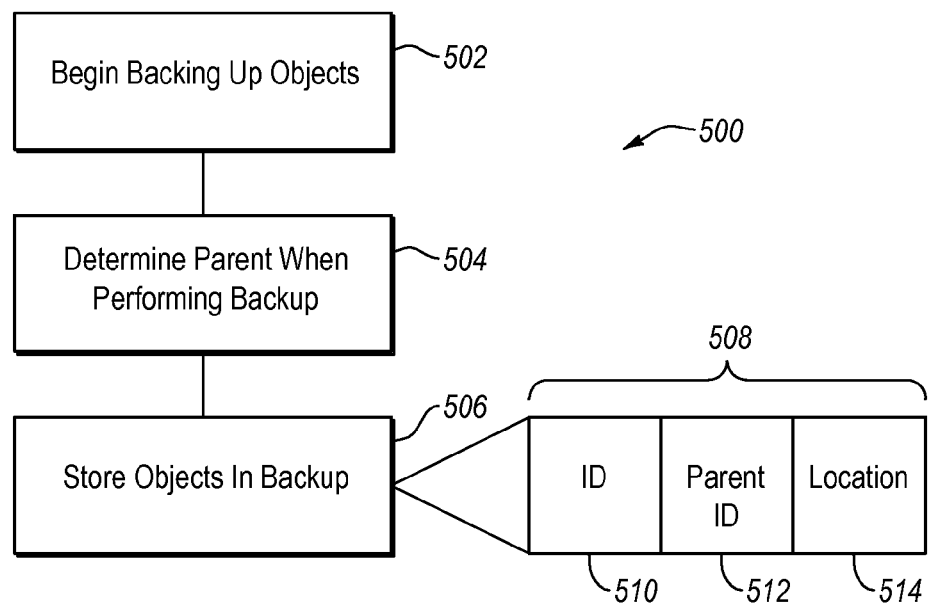
FIG. 5 illustrates an example of a method for backing up data such as related objects.

In this context, FIG. 5 illustrates a method 500 for backing up the data of a client such as the data 200. The process of backing up objects or data begins in block 502. The backup operation may be initiated by a client, the web application, the data protection application, according to a schedule, or the like or combination thereof. When the objects are backed up, the relationships are determined in block 504. These relationships may include identifying the parent object(s)

and/or the child object(s). Once these relationships are determined, the objects are stored as a backup in block 506.

Table 508 illustrates an example of information that may be stored with the backup. The table may include an ID 510 of an object, the reference ID 512 of the object, and a location 514 of the data in the backup. The ID 510 and the reference ID 512 may be the identifiers assigned by the web application in one example. In this example, the reference ID may correspond to the ID of a parent object. The reference ID 512 may have been determined as discussed in more detail below.

Figure 6:
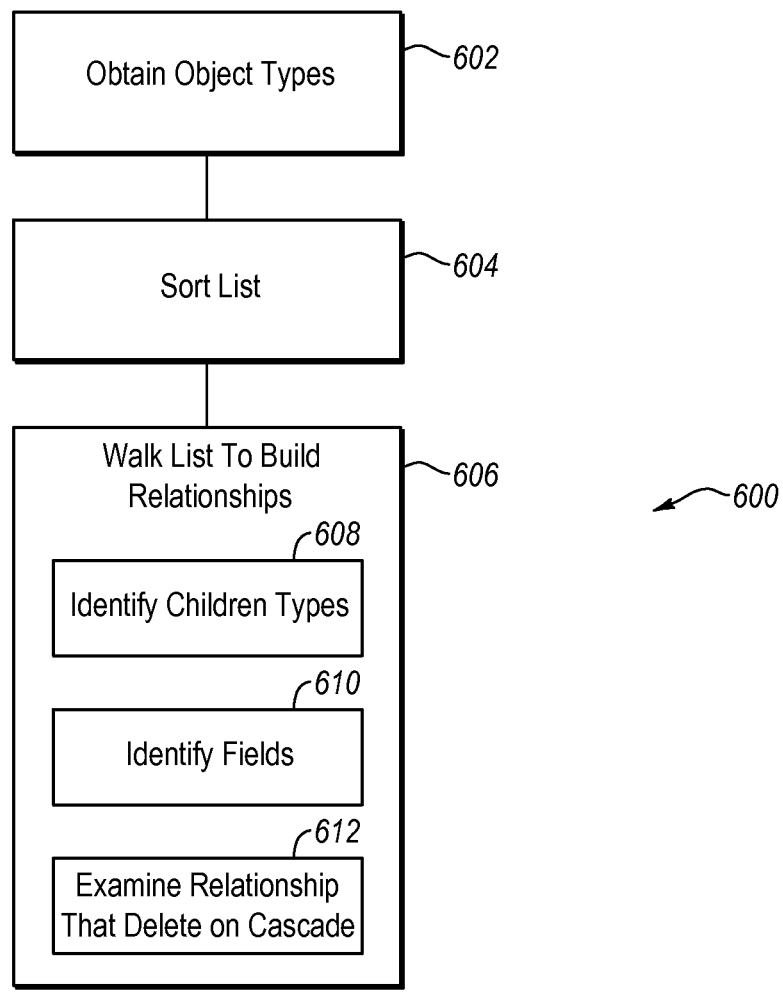
FIG. 6 illustrates a further example of a method for backing up data such as related objects.

FIG. 6 illustrates an example of a method 600 for determining the relationships between objects. The method 600 may be performed in the context of performing a backup operation. When performing a backup operation to backup a client's objects or data, the object types are determined in block 602. The object types can be determined by querying the web application for a list of object types supported by the web application. The result of this query provides the data protection application with an understanding of the potential data that may be included in each object type and the fields that may be used to reference another object.

In box 604, the object types are sorted. In one example, the object types are sorted alphabetically. In box 606, the list is walked in order to identify and build relationships between the various object types and/or between specific nodes. As shown in FIG. 5, the table 508 may then persist the relationships between objects. In one example, these relationships may be used to identify parent objects and child objects. A child object may be associated with a reference ID 512 that points to or identifies a parent object. The reference ID 512 of a parent object may be empty or NULL.

Walking the list may include identifying children types in block 608 of a given object, identifying fields of each object type in block 610, and examining relationship data when objects are deleted in a cascading manner in block 612. These steps or acts can be performed in any order and/or at the same time. The children types (which are those that may referent the parent type) may be enumerated in the information that describes the particular type.

For example, information describing an object of type account may identify that the account type object can be referenced by contact type objects. The information may also identify which field is used to reference the parent object or node. Alternatively, the child object may be processed to determine the field that is used to reference the parent object. In effect, the contact objects may be children of the account object.

For example, a review of a parent object may reveal that an account type object can be referenced by a contact type object. The specific field may be unknown. In this case, the list of potential relationships is examined to determine the field(s) that reference the account object. These fields are then examined to see which one of them contain a value that references another object. Any field that contains a value would therefore indicate a dependent relationship. Once this field is identified, the relationship is determined and recorded in the backup.

In one example, the deletion of an object may result in the deletion of multiple objects. With reference to FIG. 2, the deletion of the parent node 202 may result in the cascaded deletion of the child nodes 204, 206 and 208. When the data protection application understands which objects are deleted in this manner (relationships between objects that are deleted on cascade), the data protection application has an understanding as to the relationships between the various objects that have been backed up and is able to properly restore the objects.

When the objects are backed up, these relationships are used to restore the objects such that the objects are related in the same manner they were related before being deleted.

Figure 7:
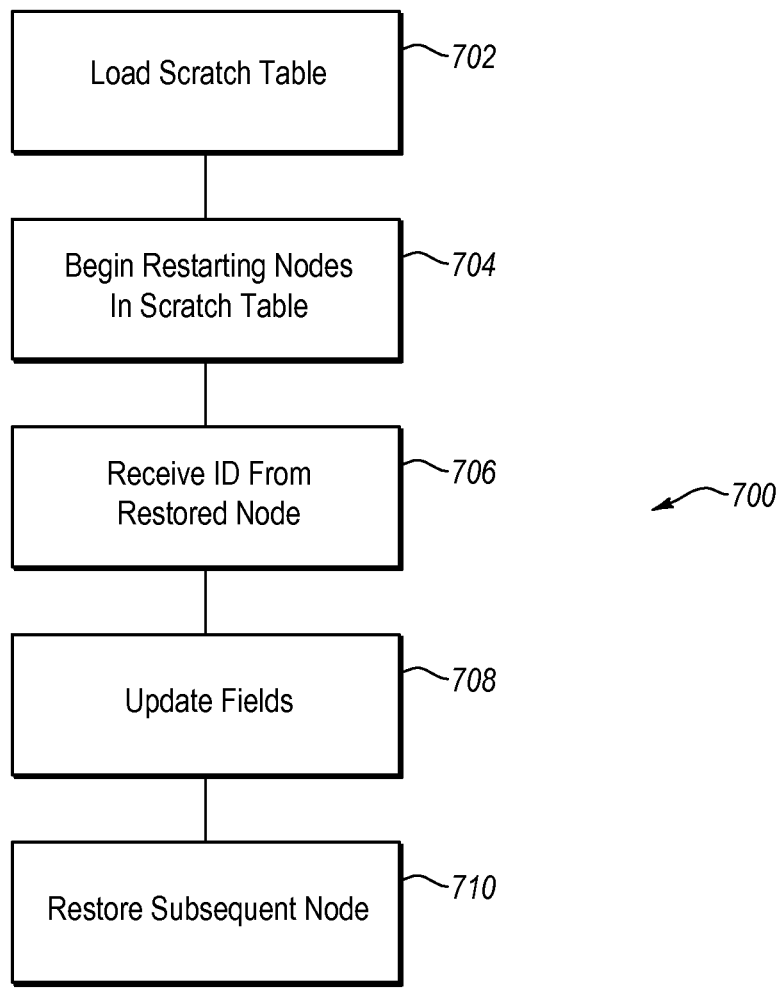
FIG. 7 illustrates an example of a method for restoring data such as objects in a web based application.

FIG. 7 illustrates a method 700 for restoring data or objects from a backup. After receiving a request to restore one or more objects or in accordance with a schedule or for other reasons, the method 700 may begin by loading a scratch table in box 702. A scratch table identifies the work to be performed and may identify, in one example, the order in which the objects are to be restored. The objects in the scratch table should be loaded hierarchically when dependencies exist between objects such as parent-child relationships. The scratch table may be generated prior to actually restoring the objects. In addition, the restore operation may be limited to a subset of the client's data.

Once the objects to be restored are identified in the scratch table, the data protection application begins to restore the objects beginning with one of the objects in box 704. For example, a first object such as a parent object is restored. This may involve a create request to the web application. After the object is created, it may be populated with data from the object's backup. As previously stated, the created object may receive a new ID from the web application, which is received by the data protection application in box 706. This new ID may be stored by the data protection application, for example, in the scratch table. The rest of the table is then processed in order, beginning with the top level of the hierarchy. Failing to follow this order would cause children to reference a non-existent parent (or throw a data validation error when an insert is attempted). In another example, the nodes or objects being restored are restored in an order that ensures that the parent exists when an insert is attempted.

When the next object is restored, the fields of the next object are updated in box 708. This may include inserting the new ID of the parent node into the field of the child object that references the parent. Thus, when restored, the child object references the new ID of the previously restored object. Thus, the relationship between parent and child is restored even if the objects are not identical to the original objects. During the restore process, this node also receives a new ID, which is received by the data protection application and stored in the scratch table. In box 710, subsequent entries in the scratch table are restored in a similar manner until the restore process is completed.

Figure 8:
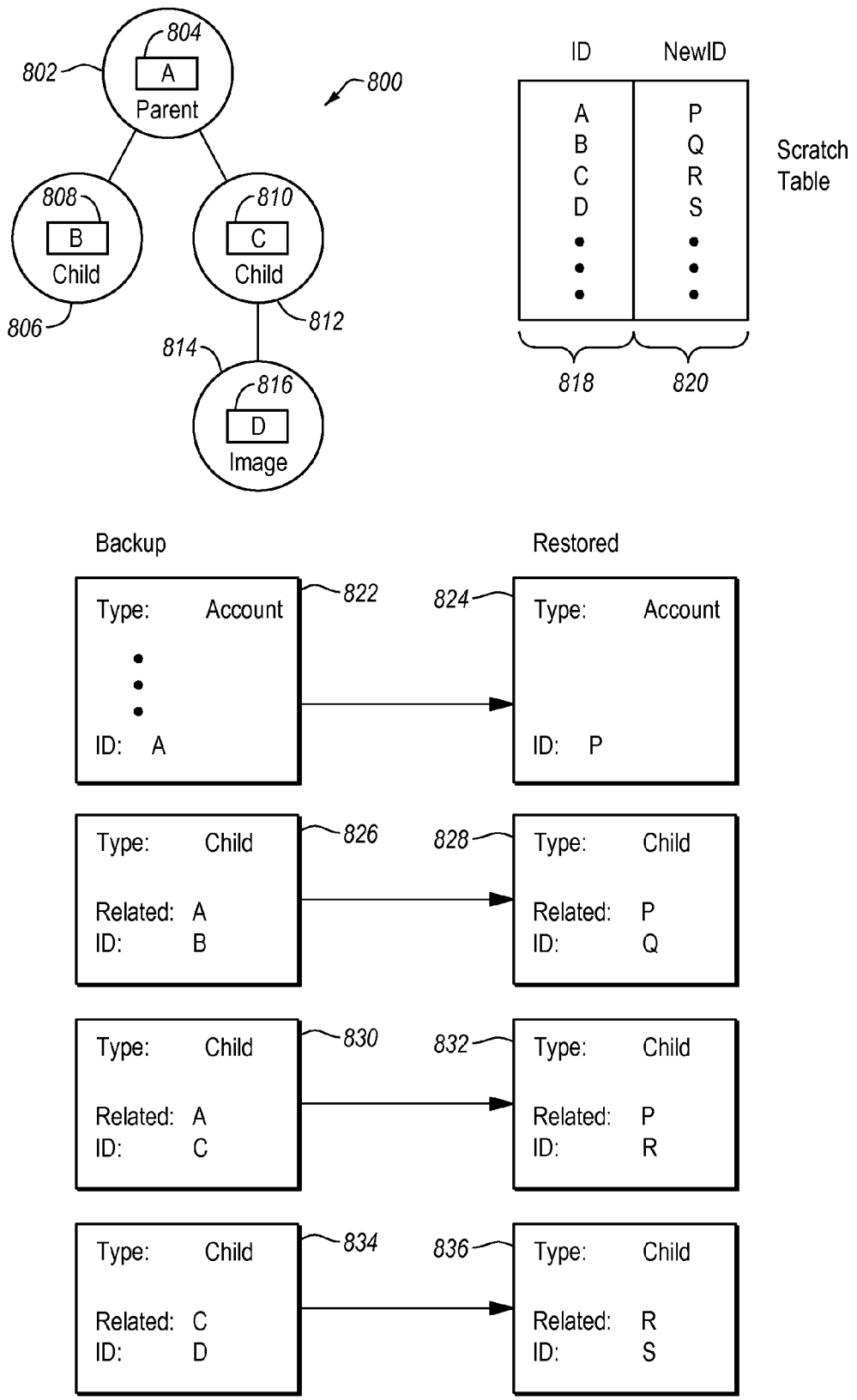
FIG. 8 illustrates a further example of a method for restoring objects in a web based application.

FIG. 8 illustrates an example of the restore process shown in FIG. 7. FIG. 8 illustrates data 800 that includes objects 802, 806, 810 and 814. These objects may be related hierarchically in one example. The objects 802, 806, 810 and 814 are associated, respectively, with identifiers 804, 808, 812 and 816. FIG. 8 illustrates the restoration of the objects 802, 806, 810 and 814.

Initially, a scratch table is populated with identifiers 818 of the objects being restored. The identifier A of the parent object 802 is loaded in the scratch table. Next, the identifiers (B and C) of the children objects of the object 802 are loaded in the scratch table. Then, the children objects 814 of the children objects 806 and 810 are loaded in the scratch table as illustrated by identifiers 818. In one example, the work to be performed is loaded into the scratch table in this manner.

Once the work to be performed in the restoration process is reflected in the scratch table, the restore process may begin. The backup object 822 is used to generate the restored object 824. The restored object 824 may be created by issuing a create objet request to the web application. The newly created restored object 824 may be assigned a new identifier P (shown in 838), which is then inserted into the scratch table or otherwise associated with the original identifier of the original object 802.

Next, the object 806 is restored from the backup object 826. In this example, a review of the backup object 826 indicates that it is related to the object having the identifier A. The scratch table is examined to determine that the original object 802 that had the identifier A now has the identifier P 830. The restored object 828 is thus updated such that the related field 840 includes the value P—not the value A. In addition, the restored object 828 receives a new identifier Q 844, which is received and stored in the scratch table as previously described.

The restoration of the nodes 810 and 814 from the corresponding backup objects 830 and 834 is performed in a similar manner. The restored nodes 832 and 836 are created and the fields are updated. Thus, the related field 844 of the restored node 832 references the restored node 824, whose new identifier is P. The ID field 846 is new. Similarly, the restored node 836 has a related ID 848 that corresponds to the new ID 846 of the restored node 832. The restored node 836 also has a new identifier 850 S.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. As well, such media are examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modulates running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for restoring objects in a web application, the method comprising:
    loading a scratch table in a first memory with identifiers of objects to be restored from a storage device, wherein the storage device is associated with a data protection application;
    restoring a first object referenced in the scratch table for a client in a second memory associated with the web application;
    receiving a new identifier of the first object from the web application as the first object is restored, wherein the new identifier is different from a backed up identifier of the first object;
    updating fields in at least one other object in the scratch table based on the new identifier of the first object; and
    restoring remaining objects referenced in the scratch table in the second memory associated with the web application,
    wherein updating fields comprises updating a field in one of the other objects that originally included an original identifier of the first object with the new identifier of the first object.

2. The method of claim 1, wherein loading a scratch table includes loading the scratch table in a hierarchical manner.

3. The method of claim 1, wherein restoring a first object includes issuing a create request to the web application to create a new object.

4. The method of claim 3, further comprising populating the new object with data from a backup of the first object.

5. The method of claim 1, further comprising issuing create requests for each of the remaining objects.

6. The method of claim 5, further comprising receiving identifiers for each of the new objects.

7. The method of claim 6, further comprising populating the new objects with data from the backups of the corresponding objects.

8. The method of claim 7, wherein one object is restored at a time.

9. The method of claim 1, wherein loading the scratch table in the first memory comprises loading the scratch table in a persistent location or in a relational database.

10. A method for restoring objects in a web based application, the method comprising:
- loading a scratch table in a persistent location in a first memory, wherein the scratch table is loaded with identifiers of objects to be restored from a storage device;
- restoring the objects identified in the scratch table in a second memory associated with the web application, wherein each object is restored with a create object request to the web based application, wherein each created object receives a new identifier assigned by the web based application during the create object request, wherein some of the objects are restored before other objects; and
- as the new objects are created, updating fields for objects that have not been restored based on the new identifiers such that the objects that are children of other objects reference the appropriate parent object; and
- populating the new objects restored in the memory associated with the web application with data from the backups of the objects identified in the scratch table.

11. The method of claim 10, further comprising updating the scratch table with the new identifiers.

12. The method of claim 10, further comprising determining relationships between the objects to be restored when the objects are backed up.

13. The method of claim 12, further comprising determining which fields of the objects reference other objects.

14. The method of claim 10, further comprising updating the fields prior to populating the new records stored by the web application.

15. The method of claim 10, further comprising restoring child objects that are associated with a parent object not present in the scratch table, wherein the relationship is restored from the backup data.

16. The method of claim 10, wherein the objects are restored by level such that each hierarchical level is restored in order.

17. The method of claim 16, wherein the at least one of the objects restored from the bin are identical to the original object, the method further comprising updating the fields of other objects being restored based on the identifiers of the restored objects such that all relationships among the restored objects correspond to the relationships existing in the original objects.

18. The method of claim 10, further comprising restoring at least one of the objects from a bin maintained by the web application if the object is present in, and has not yet been expunged from the bin.

19. The method of claim 18, wherein the bin comprises a staged deletion area.

* * * * *